A. McMAHON.
LINK PIN FOR DREDGER BUCKET CHAINS.
APPLICATION FILED MAY 12, 1920.

1,429,518.

Patented Sept. 19, 1922.

INVENTOR
Arthur McMahon
BY Chas. E Townsend
ATTORNEY

Patented Sept. 19, 1922.

1,429,518

UNITED STATES PATENT OFFICE.

ARTHUR McMAHON, OF SCOTIA, CALIFORNIA.

LINK PIN FOR DREDGER-BUCKET CHAINS.

Application filed May 12, 1920. Serial No. 380,806.

*To all whom it may concern:*

Be it known that I, ARTHUR McMAHON, a citizen of the United States, residing at Scotia, in the county of Humboldt and State of California, have invented a new and useful Improvement in Link Pins for Dredger-Bucket Chains, of which the following is a specification.

This invention relates to an improved link pin construction for connecting adjacent links of a dredger bucket chain or the like.

One of the objects of the invention is that the pin shall be freely turnable.

Another object of the invention is that the pin can be freely inserted or withdrawn to connect or disconnect the chain links as the case may be.

It is also an object that the pin construction be simple and efficient and devoid of any interfering projections or the like.

Other objects will hereinafter appear.

The invention is illustrated by way of example in the accompanying drawings, in which.

Figure 1:
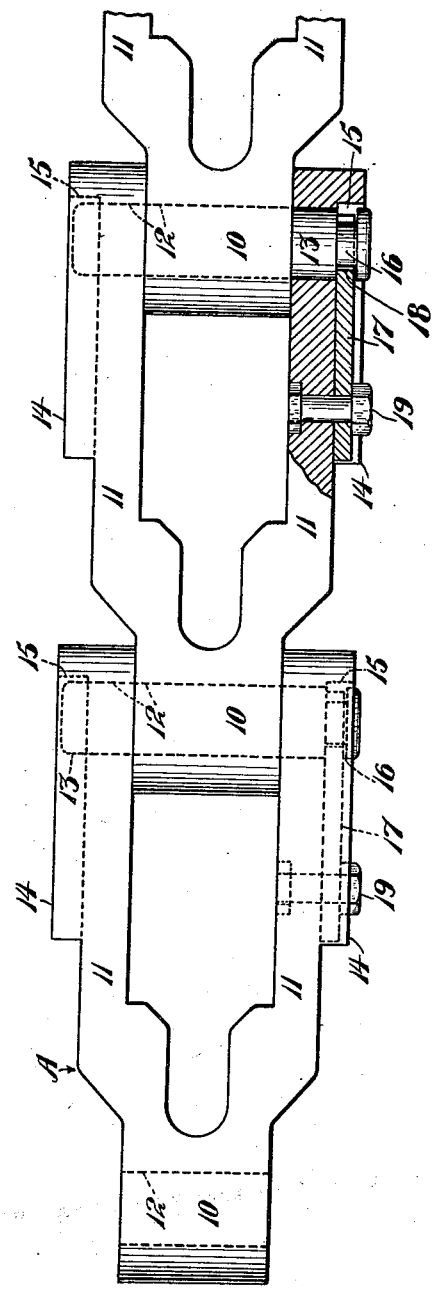
Fig. 1 is a top plan view of connected link members of the dredger bucket chain illustrating the embodiment of my invention.
Figure 2:
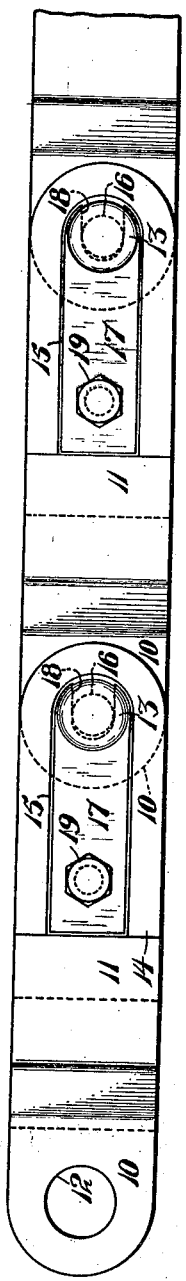
Fig. 2 is a side elevation of Fig. 1.

Referring to the drawings more particularly: A illustrates generally a type of link commonly employed in dredger bucket chains. The link in this instance consists of a head portion 10 and two leg portions 11 extending therefrom; the leg portions being sufficiently spaced to accommodate a head 10 therebetween. The sides of the legs are flat while the head is rounded as shown in Fig. 1. In the head and near each of the ends of the legs there is provided an opening 12. Each of these openings have the same diameter and are adapted to receive a pin 13; the openings in the legs 11, of course, being in alignment. The legs each have an enlarged portion 14 extending from the outer sides thereof and in each enlarged portion there is provided a recess 15 extending longitudinally and terminating near the ends of the legs. The pins 13 are of sufficient length so that their ends are substantially flush with the outer sides of the enlarged portions 14.

Near one end of the pin 13 there is provided an annular groove 16. A rectangular shaped keeper-plate 17 adapted to slide within a recess 15, has in its one end a recess or opening 18 which is adapted to engage in the groove 16 of the pin 13. The inner end of the recess 18 in the keeper is rounded in order to permit the pin 13 to freely rotate. In order to hold the keeper-plate 17 against displacement, openings are provided in the keeper-plate and one leg of the link, said openings being adapted to receive a bolt 19 whereby the plate is securely held in position.

It is well known the dredger buckets are placed upon the upper sides of the link members and may be either formed integrally therewith or secured thereto by bolts or rivets. When it is desired to connect the links the head portion 10 of one link is brought between the leg portions 11 of another link so that the openings 12 are in registering position and then the pin 13 is slipped into position. The keeper-plate 17 is then put into position and secured by the bolt 19. In disconnecting any of the link members these operations are simply reversed. Also it may be pointed out that by having the free end of the pin 13 extending into the recess 15 that the same may be easily knocked out with a hammer in case it may become rusted or in some other way caught in its applied position.

While I have shown and described the use of my invention in connection with dredger bucket chains, it is to be understood that I am not to be so limited but that I am entitled to any use to which the same pin construction would be appliable for producing like results.

Having thus described my invention what I claim and desire to secure by Letters Patent is:

The combination of dredger bucket chain links comprising spaced sides and a head connecting the sides at the inner ends thereof, each side being provided at its outer faces with a longitudinal enlargement having a longitudinal recess extending from the inner end of the enlargement and terminating short of the outer end of the same to form an outer end wall for the recess, each link having its head fitted between the sides of a contiguous link, the said links being provided through their heads and through their sides at the outer ends of the recesses with transverse aligning openings, a hinge pin passing through the aligning openings and connecting the links, said pin being of cylindrical form to permit it to rotate freely in the said openings and provided at one end with an annular groove, a flat locking plate arranged in one of the recesses and agreeing in form and depth with the same so as to nest snugly therein, said plate being formed with an open ended fork at one end, the arms of which extend into the annular groove of the pin at opposite sides thereof to retain the pin in the said openings, and a fastening device detachably securing the plate within the said recess in fixed relation with the link on which it is mounted and with its forked end at the closed end of the said recess.

ARTHUR McMAHON